(12) United States Patent
Godin et al.

(10) Patent No.: US 11,330,557 B2
(45) Date of Patent: May 10, 2022

(54) APPARATUSES, SYSTEMS, METHODS, AND NON-TRANSITORY COMPUTER READABLE MEDIA FOR REDUCING SIGNALING MESSAGES BETWEEN A RAN NODE AND A CORE NETWORK

(71) Applicant: Nokia Technologies Oy, Espoo (FI)

(72) Inventors: Philippe Godin, Versailles (FR); Jean-Michel Pugeat, Paris (FR); Anna Sillanpaa, Jarvenpaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/148,975

(22) Filed: Jan. 14, 2021

(65) Prior Publication Data

US 2021/0243723 A1    Aug. 5, 2021

Related U.S. Application Data

(63) Continuation of application No. PCT/US2020/016083, filed on Jan. 31, 2020.

(51) Int. Cl.
*H04W 68/02* (2009.01)
*H04W 48/02* (2009.01)
(Continued)

(52) U.S. Cl.
CPC .......... *H04W 68/02* (2013.01); *H04W 48/02* (2013.01); *H04W 48/18* (2013.01); *H04W 76/15* (2018.02); *H04W 76/27* (2018.02); *H04W 88/10* (2013.01)

(58) Field of Classification Search
CPC ..... H04W 68/02; H04W 48/02; H04W 48/18; H04W 76/15; H04W 76/27; H04W 88/10
(Continued)

(56) References Cited

U.S. PATENT DOCUMENTS

2005/0118992 A1    6/2005    Jeong et al.
2010/0323662 A1   12/2010   Dahlen et al.
(Continued)

FOREIGN PATENT DOCUMENTS

EP    2645804 A1    10/2013

OTHER PUBLICATIONS

"Correction of NG connection in MR DC", 3GPP TSG-RAN WG3#106, R3-197671, Nokia, Nov. 18-22, 2019, 2 pages.
(Continued)

*Primary Examiner* — Inder P Mehra
(74) *Attorney, Agent, or Firm* — Nokia Technologies Oy

(57) ABSTRACT

A system, apparatus, method, and non-transitory computer readable medium for reducing and/or optimizing signaling messages between a radio access network (RAN) node and a core network based on an operation mode of the RAN node may include a core network server including: a memory storing computer readable instructions; and at least one processor configured to execute the computer readable instructions to establish a control plane connection with at least one radio access network (RAN) node, the at least one RAN node supporting at least a first connection mode and a second connection mode, determine a connection mode of the at least one RAN node, and restrict transmission of at least one signaling message to the at least one RAN node based on results of the determining the connection mode of the at least one RAN node.

20 Claims, 9 Drawing Sheets

(51) Int. Cl.
  *H04W 48/18* (2009.01)
  *H04W 76/15* (2018.01)
  *H04W 76/27* (2018.01)
  *H04W 88/10* (2009.01)

(58) Field of Classification Search
  USPC .......................................................... 370/328
  See application file for complete search history.

(56) References Cited

U.S. PATENT DOCUMENTS

| | | |
|---|---|---|
| 2015/0208235 A1 | 7/2015 | Ingale et al. |
| 2016/0112943 A1 | 4/2016 | Horn et al. |
| 2017/0332372 A1 | 11/2017 | Lee et al. |
| 2018/0279214 A1 | 9/2018 | Chandramouli et al. |
| 2019/0069205 A1 | 2/2019 | Lee et al. |
| 2020/0113015 A1* | 4/2020 | Basu Mallick ... H04W 52/0216 |

OTHER PUBLICATIONS

"Correction of DC Operation Mode", 3GPP TSG-RAN WG3#107, R3-20xxxx, Nokia, Feb. 24-28, 2020, 11 pages.
"Correction of DC operation mode", 3GPP TSG-RAN WG3#107, R3-20xxxx, Agenda item: 9.3.xx, Nokia, Feb. 24-28, 2020, pp. 1-3.
International Search Report and Written Opinion received for corresponding Patent Cooperation Treaty Application No. PCT/US2020/016083, dated Jun. 16, 2020, 10 pages.

* cited by examiner

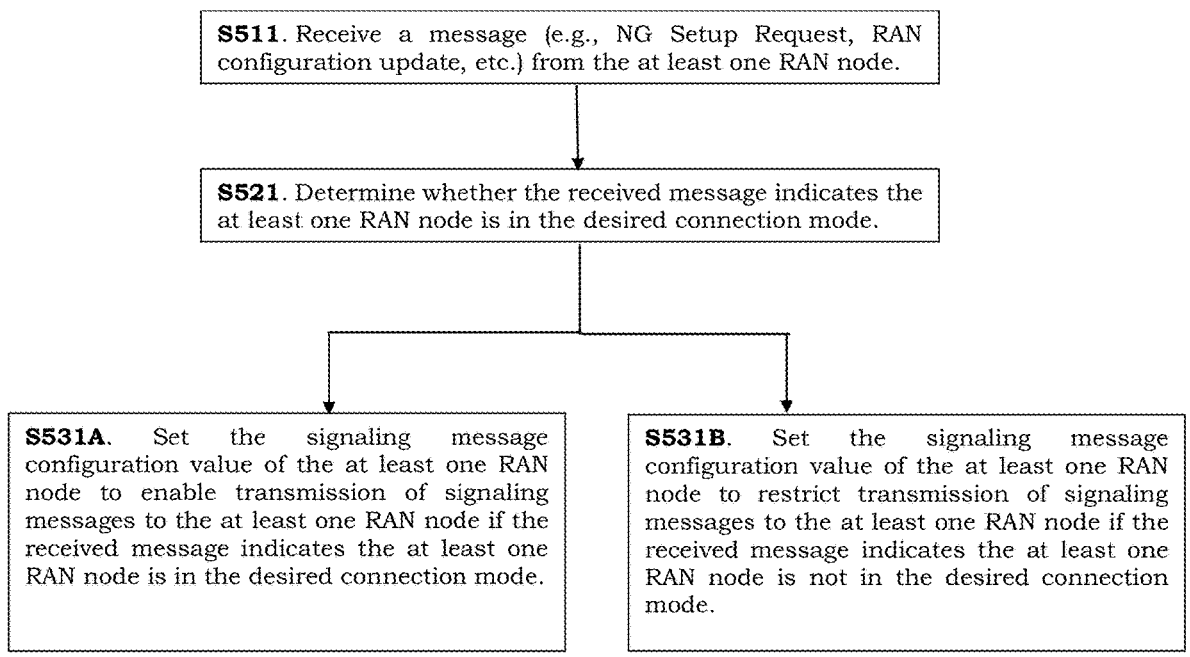

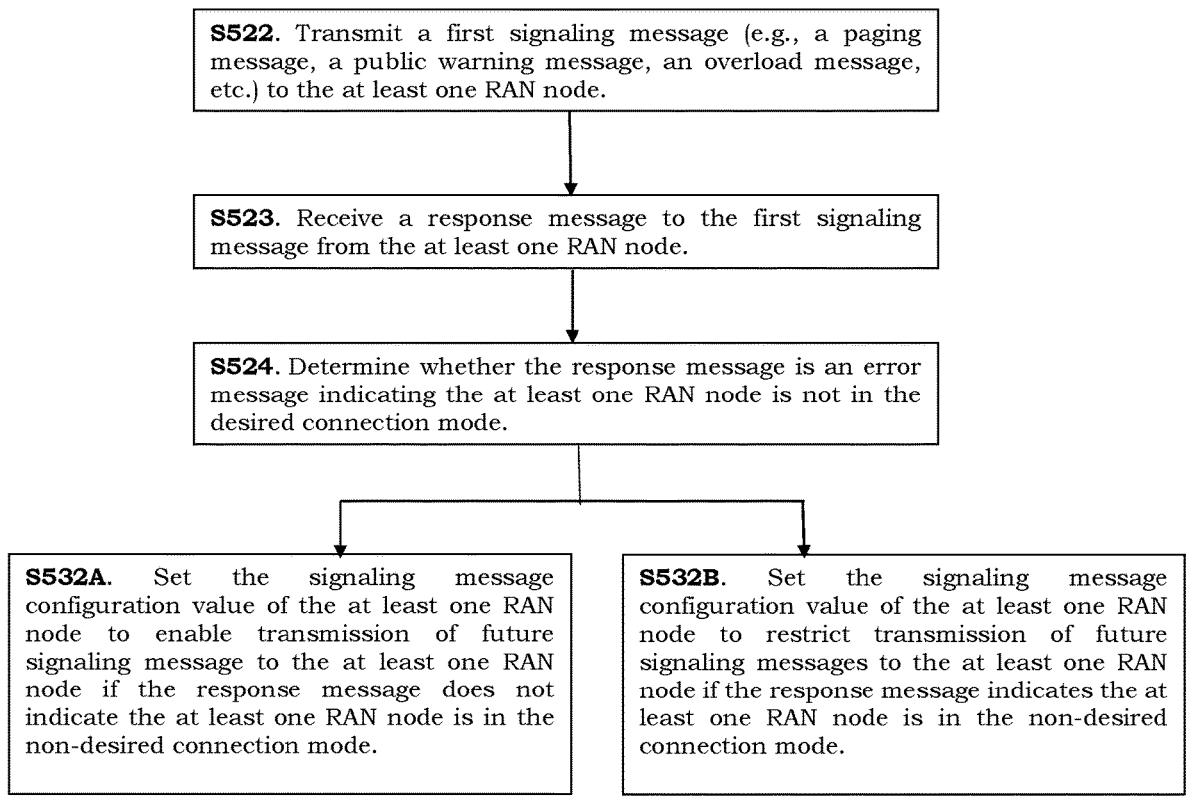

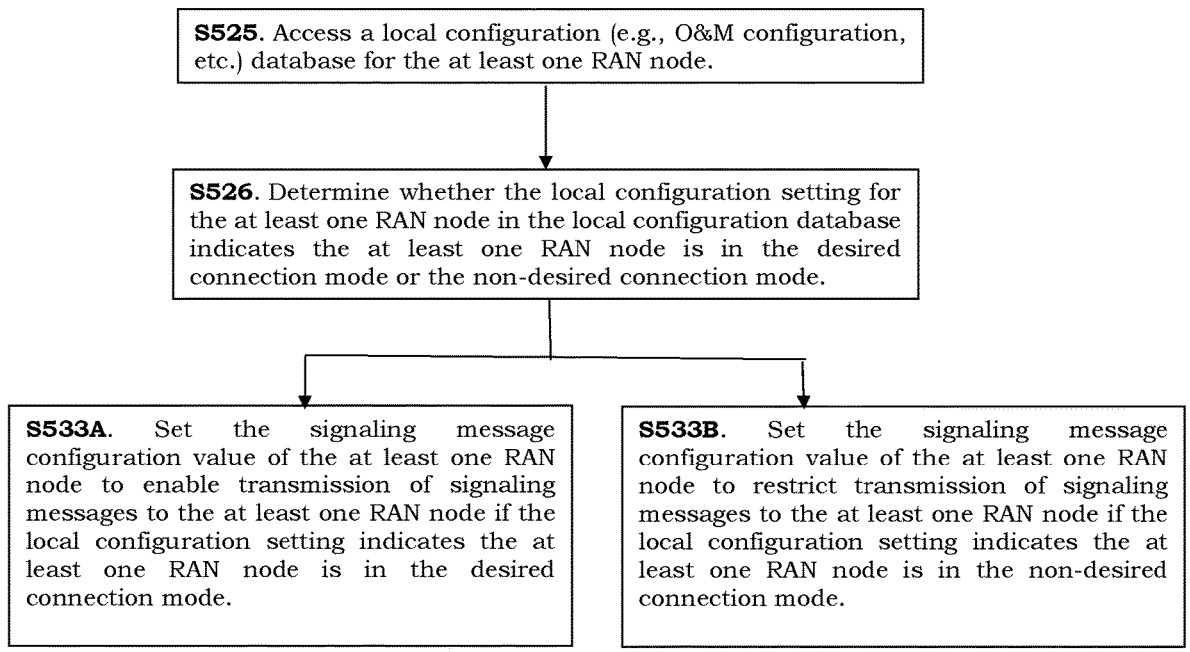

Fig. 6

S610. Set a connection mode of the RAN node, the connection mode being at least a first connection mode or a second connection mode, etc.

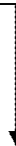

S620. Establish a control plane connection with at least one core network server.

S630. Transmit at least one message to the at least one core network server, the at least one message including an indication of the connection mode of the RAN node, the transmitted at least one message causing the at least one core network server to selectively restrict transmission of at least one signaling message to the RAN node based on the indication of the connection mode.

APPARATUSES, SYSTEMS, METHODS, AND NON-TRANSITORY COMPUTER READABLE MEDIA FOR REDUCING SIGNALING MESSAGES BETWEEN A RAN NODE AND A CORE NETWORK

CROSS-REFERENCE TO RELATED APPLICATION

This application is a continuation under 35 U.S.C. § 111(a) of International Application No. PCT/US2020/016083 filed on Jan. 31, 2020, titled "APPARATUSES, SYSTEMS, METHODS, AND NON-TRANSITORY COMPUTER READABLE MEDIA FOR REDUCING SIGNALING MESSAGES BETWEEN A RAN NODE AND A CORE NETWORK," the content of which is incorporated herein by reference in its entirety.

BACKGROUND

Field

Various example embodiments relate to methods, apparatuses, systems, and/or non-transitory computer readable media for reducing and/or optimizing signaling messages between one or more radio access network (RAN) nodes and a core network based on a connection mode of the RAN node(s).

Description of the Related Art

Currently, a $5^{th}$ generation mobile network (5G) standard, referred to as 5G New Radio (NR), is being developed to provide higher capacity, higher reliability, and lower latency communications than the 4G long term evolution (LTE) standard. In a wireless communication network operating under the 5G protocol, one or more user equipment (UE) devices connect to the 5G core network through one or more radio access network (RAN) nodes (e.g., a base station (BS)). The 5G core network will provide network functionality to the UE devices and/or the RAN nodes, such as voice packet transmission, data packet transmission, control packet transmission, etc.

Under the 5G standard, every 5G RAN node receives signaling messages (e.g., control plane messages), such as NGAP signaling messages, etc., from the 5G core network related to the control plane of the network. However, this behavior is undesired, inefficient, and/or unnecessary because not every RAN node performs control plane processing. Therefore, transmitting signaling messages to every RAN node on the network results in the inefficient usage of network resources, and therefore do not need to receive the signaling messages.

Accordingly, an approach is desired that reduces and/or optimizes the number of signaling messages transmitted by at least one core network element to RAN nodes based on the connection mode of each RAN node.

SUMMARY

At least one example embodiment relates to a core network server communicating with at least one radio access network (RAN) node supporting at least a first connection mode and a second connection mode.

In at least one example embodiment, a core network server may include a memory storing computer readable instructions and at least one processor configured to execute the computer readable instructions to establish a control plane connection with at least one radio access network (RAN) node, the at least one RAN node supporting at least a first connection mode and a second connection mode, determine a connection mode of the at least one RAN node, and restrict transmission of at least one signaling message to the at least one RAN node based on results of the determining the connection mode of the at least one RAN node.

Some example embodiments of the core network server provide the at least one processor is further configured to enable transmission of the at least one signaling message by setting a signaling message configuration value corresponding to the at least one RAN node based on the determined connection mode of the at least one RAN node.

Some example embodiments of the core network server provide the at least one processor is further configured to restrict transmission of the at least one signaling message by setting a signaling message configuration value corresponding to the at least one RAN node based on the determined connection mode of the at least one RAN node.

Some example embodiments of the core network server provide the at least one processor is further configured to set a signaling message configuration value corresponding to the at least one RAN node to enable transmission of the at least one signaling message to the at least one RAN node in response to the connection mode of the at least one RAN node being the first connection mode, and set a signaling message configuration value corresponding to the at least one RAN node to restrict transmission of the at least one signaling message to the at least one RAN node in response to the connection mode of the at least one RAN node being the second connection mode.

Some example embodiments of the core network server provide that the first connection mode is a standalone architecture (SA) mode, the at least one RAN node is a plurality of RAN nodes, and the at least one processor is further configured to determine which RAN nodes of the plurality of RAN nodes are in the SA mode, and set a signaling message configuration value to enable transmission of at least one signaling message to the RAN nodes of the plurality of RAN nodes that are determined to be in the SA mode.

Some example embodiments of the core network server provide that the second connection mode is a non-standalone architecture (NSA) mode, the at least one RAN node is a plurality of RAN nodes, and the at least one processor is further configured to determine which RAN nodes of the plurality of RAN nodes are in the NSA mode, and set a signaling message configuration value to restrict transmission of at least one signaling message to the RAN nodes of the plurality of RAN nodes that are determined to be in the NSA mode.

Some example embodiments of the core network server provide that the at least one processor is further configured to determine the connection mode of the at least one RAN node by receiving a message from the at least one RAN node, the message indicating that the at least one RAN node is in the first connection mode or the second connection mode, and setting a signaling message configuration value corresponding to the at least one RAN node based on the connection mode of the at least one RAN node indicated in the received message.

Some example embodiments of the core network server provide that the at least one processor is further configured to determine the connection mode of the at least one RAN node by transmitting a first signaling message to the at least one RAN node, receiving a response message from the at least one RAN node corresponding to the first signaling message, determining whether the response message includes an indication the at least one RAN node is in the second connection mode, and restricting transmission of at least one second signaling message to the at least one RAN node based on results of the determining whether the response message includes the indication the at least one RAN node is in the second connection mode.

Some example embodiments of the core network server provide the at least one processor is further configured to selectively transmit at least one signaling message to the at least one RAN node based on results of the determining the connection mode of the at least one RAN node.

At least one example embodiment relates to a radio access network (RAN) node supporting at least a first connection mode and a second connection mode.

In at least one example embodiment, the RAN node includes a memory storing computer readable instructions, and at least one processor configured to execute the computer readable instructions to set a connection mode of the RAN node, the connection mode being at least a first connection mode or a second connection mode, and transmit at least one message to at least one core network server, the at least one message including an indication of the connection mode of the RAN node, the transmitted at least one message causing the at least one core network server to selectively restrict transmission of at least one signaling message to the RAN node based on the indication of the connection mode.

Some example embodiments of the RAN node provide that the first connection mode is a standalone architecture (SA) mode, and the second connection mode is a non-standalone architecture (NSA) mode.

Some example embodiments of the RAN node provide that the transmitted at least one message indicates that the RAN node is in the first connection mode, the transmitted at least one message causing the at least one core network server to enable transmission of the at least one signaling message to the RAN node.

Some example embodiments of the RAN node provide that the transmitted at least one message indicates that the RAN node is in the second connection mode, the transmitted at least one message causing the at least one core network server to restrict transmission of the at least one signaling message to the RAN node.

Some example embodiments of the RAN node provide that the at least one processor is further configured to receive a first signaling message from the at least one core network server, and transmit the at least one message to the at least one core network server, the at least one message including the indication of the connection mode of the RAN node in response to the first signaling message.

At least one example embodiment relates to a method of operating at least one core network server.

In at least one example embodiment, the method includes establishing, using at least one processor, a control plane connection with at least one radio access network (RAN) node, the at least one RAN node supporting at least a first connection mode and a second connection mode, determining, using the at least one processor, a connection mode of the at least one RAN node, setting, using the at least one processor, a signaling message configuration value corresponding to the at least one RAN node based on results of the determining the connection mode of the at least one RAN node, and determining, using the at least one processor, whether to transmit at least one signaling message to the at least one RAN node based on the signaling message configuration value for the at least one RAN node.

Some example embodiments of the method provide that the determining whether to transmit the at least one signaling message to the at least one RAN node includes enabling transmission of the at least one signaling message to the at least one RAN node in response to the signaling message configuration value of the at least one RAN node indicating the at least one RAN node is in the first connection mode, and restricting transmission of the at least one signaling message to the at least one RAN node in response to the signaling message configuration value of the at least one RAN node indicating the at least one RAN node is in the second connection mode.

Some example embodiments of the method further include receiving, using the at least one processor, a message from the at least one RAN node, the message indicating that the at least one RAN node is in the first connection mode or the second connection mode.

Some example embodiments of the method further include updating, using the at least one processor, the signaling message configuration value corresponding to the at least one RAN node based on the indication of the received message.

Some example embodiments of the method provide that the determining whether the at least one RAN node is in the first connection mode includes transmitting a first signaling message to the at least one RAN node, and receiving a response message corresponding to the first signaling message from the at least one RAN node. The determining whether to transmit the at least one signaling message to the at least one RAN node may further include determining whether the response message includes an indication that the at least one RAN node is in the second connection mode, and restricting transmission of the at least one signaling message to the at least one RAN node based on results of the determining whether the response message includes the indication.

Some example embodiments of the method further include transmitting, using the at least one processor, the at least one signaling message to the at least one RAN node based on results of the determining whether to transmit the at least one signaling message to the at least one RAN node.

In at least one example embodiment, a non-transitory computer readable medium storing computer readable instruction for performing the method of operating at least one core network server is provided.

At least one example embodiment relates to a core network server communicating with at least one radio access network (RAN) node supporting at least a first connection mode and a second connection mode.

In at least one example embodiment, the core network server may include means for establishing a control plane connection with at least one radio access network (RAN) node, the at least one RAN node supporting at least a first connection mode and a second connection mode, determining a connection mode of the at least one RAN node, and restricting transmission of at least one signaling message to the at least one RAN node based on results of the determining the connection mode of the at least one RAN node.

Some example embodiments provide that the core network server may further include means for enabling transmission of the at least one signaling message by setting a signaling message configuration value corresponding to the at least one RAN node based on the determined connection mode of the at least one RAN node.

Some example embodiments provide that the core network server may further include means for restricting transmission of the at least one signaling message by setting a signaling message configuration value corresponding to the at least one RAN node based on the determined connection mode of the at least one RAN node.

Some example embodiments provide that the core network server may further include means for setting a signaling message configuration value corresponding to the at least one RAN node to enable transmission of the at least one signaling message to the at least one RAN node in response to the connection mode of the at least one RAN node being the first connection mode, and setting a signaling message configuration value corresponding to the at least one RAN node to restrict transmission of the at least one signaling message to the at least one RAN node in response to the connection mode of the at least one RAN node being the second connection mode.

Some example embodiments provide that the first connection mode is a standalone architecture (SA) mode, and the at least one RAN node is a plurality of RAN nodes. The core network server may further include means for determining which RAN nodes of the plurality of RAN nodes are in the SA mode, and setting a signaling message configuration value to enable transmission of at least one signaling message to the RAN nodes of the plurality of RAN nodes that are determined to be in the SA mode.

Some example embodiments provide that the second connection mode is a non-standalone architecture (NSA) mode, and the at least one RAN node is a plurality of RAN nodes. The core network server may further include means for determining which RAN nodes of the plurality of RAN nodes are in the NSA mode, and setting a signaling message configuration value to restrict transmission of at least one signaling message to the RAN nodes of the plurality of RAN nodes that are determined to be in the NSA mode.

Some example embodiments provide that the core network server may further include means for receiving a message from the at least one RAN node, the message indicating that the at least one RAN node is in the first connection mode or the second connection mode, and setting a signaling message configuration value corresponding to the at least one RAN node based on the connection mode of the at least one RAN node indicated in the received message.

Some example embodiments provide that the core network server may further include means for transmitting a first signaling message to the at least one RAN node, receiving a response message from the at least one RAN node corresponding to the first signaling message, determining whether the response message includes an indication the at least one RAN node is in the second connection mode, and restricting transmission of at least one second signaling message to the at least one RAN node based on results of the determining whether the response message includes the indication the at least one RAN node is in the second connection mode.

Some example embodiments provide that the core network server may further include means for selectively transmit at least one signaling message to the at least one RAN node based on results of the determining the connection mode of the at least one RAN node.

At least one example embodiment relates to a radio access network (RAN) node supporting at least a first connection mode and a second connection mode.

In at least one example embodiment, the RAN node includes means for setting a connection mode of the RAN node, the connection mode being at least a first connection mode or a second connection mode, and transmitting at least one message to at least one core network server, the at least one message including an indication of the connection mode of the RAN node, the transmitted at least one message causing the at least one core network server to selectively restrict transmission of at least one signaling message to the RAN node based on the indication of the connection mode.

Some example embodiments provide that the first connection mode is a standalone architecture (SA) mode, and the second connection mode is a non-standalone architecture (NSA) mode.

Some example embodiments provide that the transmitted at least one message indicates that the RAN node is in the first connection mode, the transmitted at least one message causing the at least one core network server to enable transmission of the at least one signaling message to the RAN node.

Some example embodiments provide that the transmitted at least one message indicates that the RAN node is in the second connection mode, the transmitted at least one message causing the at least one core network server to restrict transmission of the at least one signaling message to the RAN node.

Some example embodiments provide that the RAN node further includes means for receiving a first signaling message from the at least one core network server, and transmitting the at least one message to the at least one core network server, the at least one message including the indication of the connection mode of the RAN node in response to the first signaling message.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 5A to 5D are flowcharts illustrating methods for operating a core network element to reduce signaling messages between the core network element and at least one RAN connected to the core network according to some example embodiments; and FIG. 6 is a flowchart illustrating a method for operating a RAN node to reduce signaling messages between the RAN node and a core network according to at least one example embodiment.

DETAILED DESCRIPTION

Figure 1:
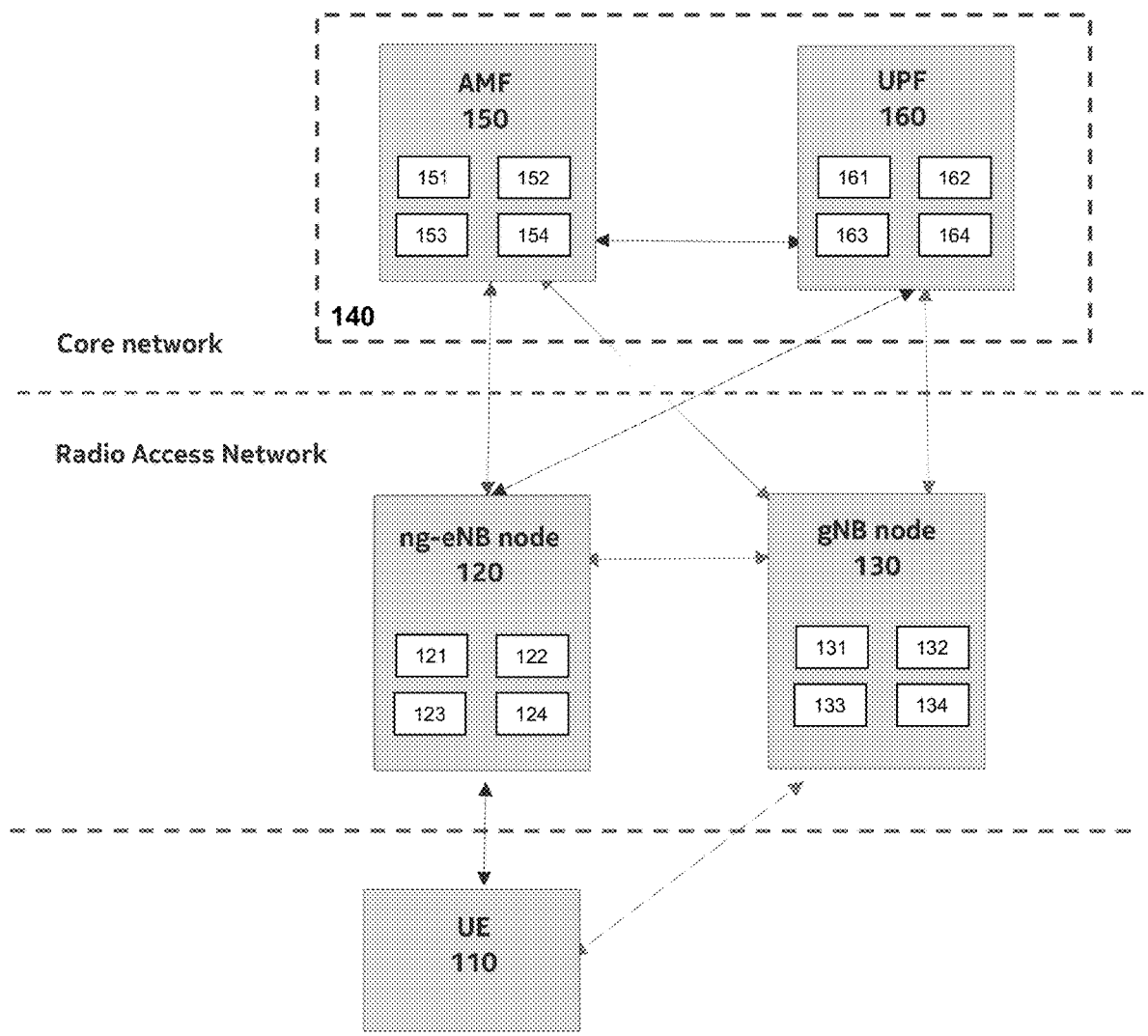
FIG. 1 illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to a network system capable of reducing and/or optimizing the transmission of signaling messages from at least one core network element and at least one RAN node based on a connection mode of the at least one RAN node. While the various example embodiments of the present disclosure are discussed in connection with the 5G wireless communication standard for the sake of clarity and convenience, the example embodiments are not limited thereto, and one of ordinary skill in the art would recognize the example embodiments may be applicable to, included in, and/or integrated into other wireless communication standards, such as the 4G wireless protocol, a WLAN wireless protocol, a future 6G wireless protocol, a future 7G wireless protocol, etc.

FIG. 1 illustrates a wireless communication system according to at least one example embodiment. As shown in FIG. 1, a wireless communication system includes at least one user equipment (UE) device (UEs or UE devices) 110, a first radio access network (RAN) node 120 and a second RAN node 130, a core network 140, and one or more core network elements (e.g., one or more core network servers, core network devices, etc.), such as AMF 150 and UPF 160, etc., but the example embodiments are not limited thereto and the example embodiments may include a greater or lesser number of constituent elements. For example, the wireless communication system may include a plurality of UE devices, a single RAN node, a plurality of RAN nodes greater than two, and/or a plurality of core network elements, core network servers, etc.

The UE 110 may connect to one or more of the RAN nodes 120 and/or 130, and/or the core network server 140 over a wireless network, such as a cellular wireless access network (e.g., a 3G wireless access network, a 4G-Long Term Evolution (LTE) network, a 5G-New Radio (e.g., 5G) wireless network, a WLAN network, a future 6G network, etc.), but is not limited thereto. The UE 110 may receive user plane communication (e.g., data communication packets, voice communication packets, etc.), from a user plane function (UPF) core network element 160 via the RAN nodes 120 and/or 130, etc.

The UE 110 may be any one of, but not limited to, a mobile device, a tablet, a laptop computer, a wearable device, an Internet of Things (IoT) device, a desktop computer and/or any other type of stationary or portable device capable of operating according to the 4G communication standard, the 5G NR communication standard, the WLAN standard, a future 6G standard, a future 7G standard, or other wireless communication standard.

Each of the RAN nodes 120 and 130 may be a network device, such as a base station (BS), an access point, a router, a switch, a cell tower, etc. The RAN nodes 120 and 130 may connect to each other, at least one core network 140 (e.g., a 4G core network, a 5G core network, a 6G core network, etc.), and/or one or more elements of the core network, such as a core network server 150 and/or 160, etc., over a wired and/or wireless network. Each of the RAN nodes 120 and 130 may operate according to at least one underlying cellular and/or wireless network communications protocol, such as the 4G long term evolution (LTE) communication protocol, the 5G new radio (NR) communication protocol, a WLAN communication protocol, a future 6G communication protocol, a future 7G communication protocol, etc. For example, the RAN node 120 may be an E-UTRA next-generation evolved NodeB (ng-eNB) node (e.g., a RAN node which communicates with a 5G-enabled UE over a 4G LTE air interface), and the RAN node 130 may be a 5G generation NodeB (gNB) node (e.g., a RAN node which communicates with a UE over a 5G NR air interface), etc., but the example embodiments are not limited thereto, and both RAN nodes may be gNB nodes, both RAN nodes may be ng-eNB nodes, and/or or may be other types of nodes, etc.

Further, the RAN nodes 120 and 130 may be single connectivity nodes (e.g., capable of supporting a single connection mode), dual-connectivity nodes (e.g., capable of supporting two connection modes), and/or multi-connectivity nodes (e.g., capable of supporting more than two connection modes). For example, the RAN nodes 120 and 130 may be capable of operating in a standalone architecture (SA) connection mode and/or a non-standalone architecture (NSA) connection mode, but are not limited thereto. If a RAN node operates in SA mode, the RAN node acts as a main node for connected UE devices, e.g., a node which performs control plane processing and user plane processing for UE devices connected to the main node. If a RAN node is in NSA mode, the RAN node acts as a secondary node for connected UE devices, e.g., a node which only performs user plane processing for UE devices connected to the secondary node, with the UE devices needing to connect to another RAN node (e.g., a main RAN node) to perform the control plane processing for these UE devices. However, the example embodiments are not limited thereto, and for example, there may be additional connection modes possible for the RAN nodes.

Referring to FIG. 1, each of the RAN nodes 120 and 130 may include at least one processor 121 or 131, a memory 123 or 133, at least one wireless antenna 122 or 132 for connecting to one or more UEs, such as the UE 110, and/or a core network interface 124 or 134 for connecting to the core network 140 and/or core network elements, such as an Access and Mobility Management Function (AMF) 150, a User Plane Function (UPF) 160, etc., but the example embodiments are not limited thereto. The memories 123 and 133 may include various program code including computer executable instructions, and may store various data and/or configuration settings associated with each RAN node, such as a connection mode configuration, etc., configuration settings associated with each connected UE device, etc.

In at least one example embodiment, the at least one processors 121 and 131 of the RAN nodes 120 and 130 may be a processor, processing circuitry, processor cores, distributed processors, networked processors, etc., which may be configured to control one or more elements of the RAN node. The at least one processors 121 and 131 are configured to execute processes by retrieving program code (e.g., computer readable instructions) and/or data from the memories 123 and 133, thereby executing special purpose control and functions of the entire RAN node 120 or 130. Once the special purpose program instructions are loaded into the at least one processors 121 and 131, the at least one processors 121 and 131 execute the special purpose program instructions, thereby transforming the at least one processors 121 and 131 into special purpose processors.

In at least one example embodiment, the memories 123 and 133 may be non-transitory computer-readable storage mediums, and each may include a random access memory (RAM), a read only memory (ROM), and/or a permanent mass storage device such as a disk drive, or a solid state drive, etc. Stored in the memories 123 and 133 are program code (i.e., computer readable instructions) related to operating the respective RAN node, the wireless antennas 122 and 132, and/or the core network interfaces 124 and 134, etc. Such software elements may be loaded from a non-transitory computer-readable storage medium independent of the memories 123 and 133, using a drive mechanism (not shown) connected to the RAN 120 or 130, or via the wireless antennas 122 and 132, and/or core network interfaces 124 and 134.

The RAN nodes 120 and 130 may also include wireless antennas 122 and 132. The wireless antennas 122 and 132 each may include an associated radio unit (not shown) and may be used to transmit wireless signals, e.g., 4G LTE wireless signals, 5G NR wireless signals, etc., to at least one UE device, such as UE 110, etc. For example, the wireless antenna 122 of the ng-eNB node 120 may be a 4G air radio interface, and the wireless antenna 132 of the gNB node 130 may be a 5G air radio interface, etc. According to some example embodiments, the wireless antenna 122 and 132 each may be a single antenna, or may be a plurality of antennas, etc.

The RAN nodes 120 and 130 may each include at least one core network interface 124 or 134, each of which may be a wired and/or wireless network interface. The core network interfaces 124 and 134 may enable the RAN nodes 120 and 130 to communicate with and/or transmit data to and from core network elements and/or servers, etc., such as core network elements 150 and 160, on the core network 140. Examples of core network elements may include a network gateway (not shown), a core network server, a core network device, etc. The core network interfaces 124 and 134 allow the UEs connected to the RAN node 120 and/or RAN node 130 to communicate with and/or transmit data using the core network 140 to other networks, such as a Data Network (DN), the Internet, telephone networks, VoIP networks, intranets, LANs, etc.

The RAN nodes 120 and 130 may be connected to and/or communicate with other core network elements, such as an Operations Administration & Management Configuration (O&M) element, a Session Management Function (SMF) element, an Authentication Server Function (AUSF) element, etc. Each of the core network elements of the core network 140, including AMF 150 and UPF 160, may be embodied as a server, a processing device, a node, a router, a network device, etc. Additionally, one or more of the core network elements may be combined into one or more servers, processing devices, nodes, routers, network devices, etc. For example, the AMF 150 and UPF 160 may be incorporated into a single core network server, etc.

According to at least one example embodiment, the AMF 150 may be configured to provide functions and capabilities relating to control plane operations, such as security of the wireless network, access management, authorization of UE devices, etc. The AMF 150 may transmit signaling traffic (e.g., signaling messages, control packets, etc.) to and/or from network equipment, such as RAN nodes, BSs, routers, switches, etc., to which the AMF 150 has established a control plane connection. Examples of signaling traffic may include paging messages, public warning messages, overload messages, etc.

The UPF 160 may be configured to provide functions and capabilities to facilitate user plane (e.g., data plane, forwarding plane, carrier plane, etc.) operation, such as carrying network user traffic (e.g., data and/or voice packets, etc.) destined for UEs, packet routing and forwarding, interconnection between UEs and a DN (e.g., the Internet, etc.), policy enforcement, data buffering, etc. For example, the UPF 160 may receive data or voice packets destined for UE 110 from the DN, and forward the data or voice packets to the RAN node that UE 110 is connected with, such as ng-eNB node 120 and/or gNB node 130, or vice versa.

According to some example embodiments, each of the core network elements, such as AMF 150 and UPF 160, may include at least one processors 151 or 161, memories 153 or 163, and/or wireless antennas 152 or 162, etc. Additionally, each of the core network elements may further include at least one core network interface, such as core network interfaces 154 and 164, for connecting to one or more RAN nodes, such as RAN nodes 120 and 130, one or more other core network elements, etc., but the example embodiments are not limited thereto. The memories 153 and 163 may include various program code including computer executable instructions, such as program code for operating the core network element, etc., and may also store various data and/or configuration settings associated with each core network element, each connected RAN node, and/or each UE device operating in at least one cell serving area and/or at least one tracking area, etc., served by the core element, such as signaling message configurations, O&M configurations, account configurations, etc. According to at least one example embodiment, the memories 153 and 163 may store a database for storing configuration setting values associated with each RAN node connected to the core network element, such as RAN nodes 120 and 130, etc., and/or each UE that is operating within and/or associated with a territorial area associated with the core network element. For example, the database may store connection mode configuration values and/or signaling message configuration values associated with each RAN node, etc.

The at least one processors 151 and 161, memories 153 and 163, wireless antennas 152 and 162, and/or core network interfaces 154 and 164, of the AMF 150 and UPF 160 may be substantially similar to and/or the same as the processors 121 and 131, memories 123 and 133, wireless antennas 122 and 132, and core network interfaces 124 and 134, of the RAN nodes 120 and 130. Accordingly, further discussion of these components will be omitted for the sake of brevity.

While certain elements of the cellular wireless network are shown as part of the wireless communication system of FIG. 1, the example embodiments are not limited thereto, and the cellar wireless network may include components other than that shown in FIG. 1, which are desired, necessary, and/or beneficial for operation of the underlying networks within the communication system 100, such as access points, switches, routers, nodes, servers, etc.

Additionally, while FIG. 1 depicts an example embodiment of the RAN nodes ng-eNB node 120 and gNB node 130, and the core network elements AMF 150 and UPF 160, the example embodiments are not limited thereto, and one or more of these elements may include additional components and/or alternative architectures that may be suitable for the purposes demonstrated.

FIGS. 2A to 4 are transmission flow diagrams between at least one core network element and a plurality of RAN nodes connected to the core network according to some example embodiments. For each of the example embodiments of FIGS. 2A to 4, it is assumed that the AMF 150 is not initially aware of the connection mode configuration status of the ng-eNB node 120 and the gNB node 130. Additionally, it is assumed that the ng-eNB node 120 is initially configured to operate in "NSA only mode," and the gNB node 130 is initially configured to operate in "SA mode." However, the example embodiments are not limited thereto, and both the ng-eNB node 120 and the gNB node 130 may operate in any of the connection modes, e.g., SA connection mode, NSA connection mode, etc. Further, while the example embodiments are discussed in the context of only two connection modes, the example embodiments are not limited thereto and there may be more than two connection modes.

Figure 2A:
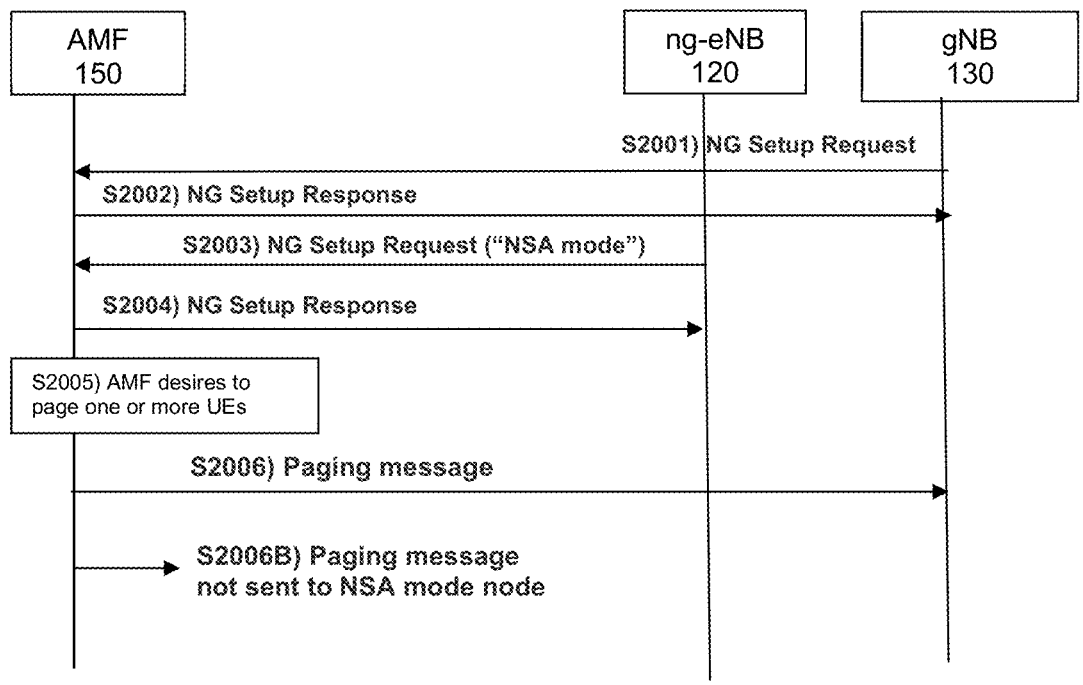
FIGS. 2A to 4 are transmission flow diagrams between at least one core network element and a plurality of RAN nodes connected to the core network according to some example embodiments.

FIG. 2A is a first transmission flow diagram between at least one core network element and a plurality of RAN nodes connected to the core network illustrating a method of semi-statically learning and/or obtaining the connection mode configuration statuses of the plurality of RAN nodes according to at least one example embodiment.

Referring to FIG. 2A, one or more RAN nodes, such as ng-eNB node 120 and gNB node 130, may be initialized and/or connected to a core network, such as core network 140. In operation S2001, the gNB node 130 may transmit a control plane connection request to the AMF 150, such as a NG setup request. The control plane connection request may include an indication of the connection mode of the gNB node 130, e.g., an indication that the gNB node 130 is in SA mode. According to some example embodiments, the connection mode indication may also be referred to as a cause value, connection mode configuration information, connection mode configuration status value, signaling message configuration value, etc. Thus, the AMF 150 learns and/or obtains the connection mode configuration status of the gNB node 130 in a semi-static manner. In operation S2002, a control plane connection (e.g., NG-C connection, etc.) is established between the gNB node 130 and the AMF 150, and the AMF 150 transmits a response to the gNB node 130's control plane connection request, e.g., a NG setup response. Additionally, the AMF 150 may create and/or update a record associated with the gNB 130 in a database, including storing the gNB node 130's connection mode configuration status and/or setting a signaling message configuration value associated with the gNB node 130 corresponding to the connection mode configuration status. The signaling message configuration value may indicate whether future signaling messages should be enabled (e.g., allowed, permitted, etc.) to the RAN node, or if future signaling messages should be restricted (e.g., denied, prohibited, etc.) to the RAN node, etc.

In operation S2003, the ng-eNB node 120 may transmit a control plane connection request, e.g., a NG setup request, etc., to the AMF 150. The control plane connection request may include an indication of the connection mode of the ng-eNB node 120, e.g., an indication that the ng-eNB node 120 is in NSA mode or NSA only mode. Thus, the AMF 150 learns and/or obtains the connection mode configuration status of the ng-eNB node 120 in a semi-static manner. In operation S2004, a control plane connection (e.g., NG-C connection, etc.) is established between the ng-eNB node 120 and the AMF 150, and the AMF 150 transmits a response to the ng-eNB node 120's control plane connection request, e.g., a NG setup response, etc. Additionally, the AMF 150 may create and/or update a record associated with the ng-eNB 120 in the database, including storing the ng-eNB node 120's connection mode configuration status and/or setting a signaling message configuration value associated with the ng-eNB node 120 corresponding to the connection mode configuration status.

Next, in operation S2005, the AMF 150 may decide to transmit a signaling message, e.g., a paging message, etc., to UEs associated with (e.g., operating within, located within, connected to a RAN node connected to the AMF 150, etc.) the territorial area assigned to the AMF 150, such as the UEs connected to ng-eNB node 120 and gNB node 130, etc. The AMF 150 may determine which RAN node(s) to transmit the signaling message to based on the received connection mode indications included in the control plane connection requests from the ng-eNB node 120 and gNB node 130, etc. In the example of FIG. 2A, in operation S2006, the AMF 150 transmits a paging message to the gNB node 130 because the gNB node 130 is in SA connection mode (e.g., a desired connection mode). The gNB node 130 then forwards the paging message to the appropriate UE device, such as UE 110. Additionally, in operation S2006B, the AMF 150 does not transmit the paging message to ng-eNB node 120 because the ng-eNB node 120 is in NSA only mode (e.g., a non-desired connection mode), thereby reducing the number of signaling messages transmitted across the network, and increasing the efficiency of network resource usage.

Referring now to FIGS. 2B to 4, for each of these example embodiments it is assumed that the AMF 150 has already established a control plane connection, e.g., NG-control (NG-C) control connection, etc., with both the ng-eNB node 120 and the gNB node 130 as described in connection with FIG. 2A, however the example embodiments are not limited thereto and other methods for establishing a control plane connection may be used, such as establishing a control plane connection between a core network element and a RAN node without the RAN node transmitting a connection mode indication within the control plane request, etc.

Figure 2B:
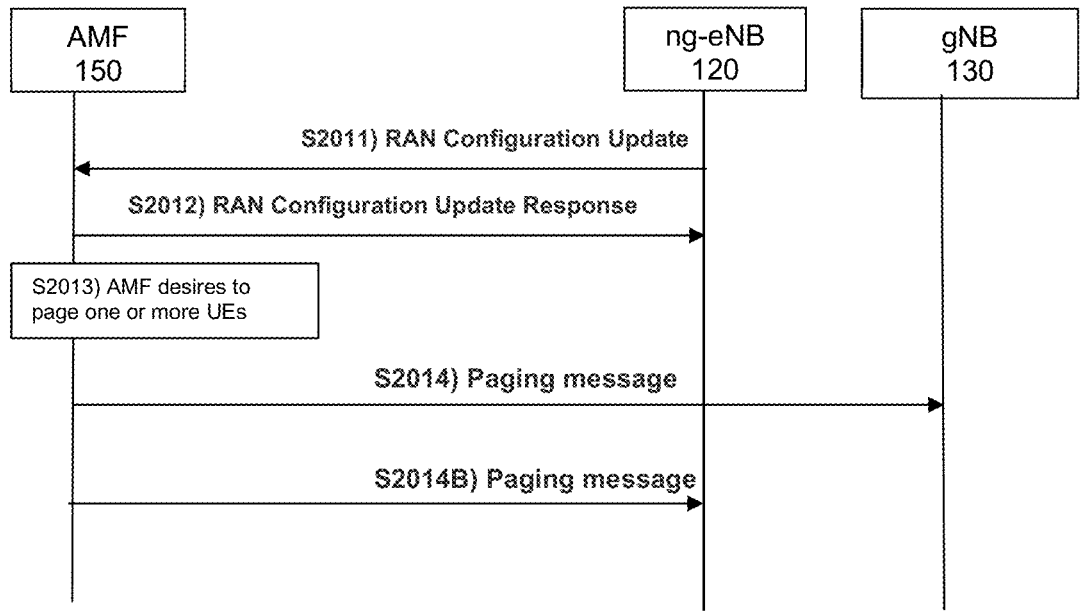

FIG. 2B is a second transmission flow diagram between at least one core network element and a plurality of RAN nodes connected to the core network illustrating a first method of dynamically configuring the connection modes of the plurality of RAN nodes according to at least one example embodiment.

In operation S2011, the ng-eNB node 120, which was previously configured to operate in NSA connection mode, may transmit a RAN configuration update message to the AMF 150. The RAN configuration update message may include an indication stating the ng-eNB node 120 is now operating in SA connection mode, along with any other configuration changes made to the ng-eNB node 120, and the AMF 150 thereby learns and/or obtains the connection mode configuration status of the ng-eNB node 120 in a dynamic manner. In operation S2012, the AMF 150 may update its records associated with the ng-eNB node 120, including updating the AMF 150's records regarding the ng-eNB node 120's connection mode configuration and/or setting a signaling message configuration value associated with the ng-eNB node 120 corresponding to the connection mode configuration status. Then, the AMF 150 transmits a RAN configuration update response to the ng-eNB node 120.

In operation S2013, the AMF 150 may decide to transmit a paging message to UEs within the AMF 150's territorial area, such as the UEs connected to ng-eNB node 120 and gNB node 130, etc. The AMF 150 may determine to transmit the signaling message to the ng-eNB node 120 based on the received RAN configuration update message. In the example of FIG. 2B, and in contrast to the example of FIG. 2A, in operations S2014 and S2014B, the AMF 150 transmits paging messages to both the gNB node 130 and the ng-eNB node 120 because both the gNB node 130 and the ng-eNB node 120 are in SA connection mode (e.g., a desired connection mode). The gNB node 130 and the ng-eNB node 120 then forward the paging message(s) to the appropriate UE devices, such as UE 110, etc. Thus, the AMF 150 correctly transmits signaling messages to the connected RAN nodes that are in SA connection mode.

Figure 3:
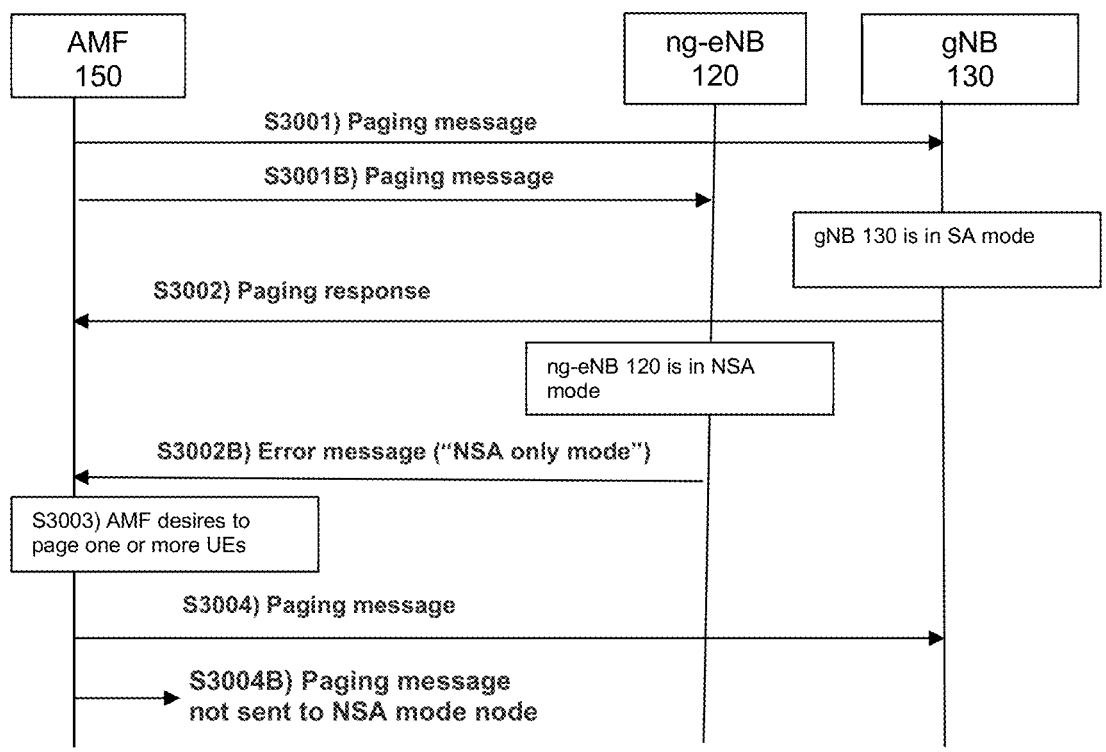

FIG. 3 is a third transmission flow diagram between at least one core network element and a plurality of RAN nodes connected to the core network illustrating a second method of dynamically configuring the connection modes of the plurality of RAN nodes according to at least one example embodiment.

In operations S3001 and S3001B, the AMF 150 transmits a first signaling message, e.g., a paging message, to both the ng-eNB node 120 and the gNB node 130, without having knowledge as to whether the ng-eNB node 120 and gNB node 130 are in SA mode or NSA mode. For example, the ng-eNB node 120 and the gNB node 130 may have established a control plane connection with the AMF 150 without having transmitted an indication of their respective connection mode statuses, etc. In operation S3002, because the gNB node 130 is in SA mode, the gNB node 130 forwards the paging message to the appropriate UEs, such as UE 110, and then forwards a paging response to the AMF 150. Because the AMF 150 has received a successful paging response from the gNB node 130, the AMF 150 is able to dynamically determine the gNB node 130 is operating in SA mode, and the AMF 150 may update its records associated with the gNB node 130, including updating the AMF 150's records regarding the gNB node 130's connection mode configuration status and/or setting a signaling message configuration value associated with the gNB node 130 corresponding to the connection mode configuration status.

In operation S3002B, because the ng-eNB node 120 is operating in NSA mode, the ng-eNB node 120 transmits an error message to the AMF 150 in response to the paging message. The error message may include a cause value indicating the connection mode configuration of the ng-eNB node 120, e.g., an indication that the ng-eNB node 120 is operating in NSA mode. Because the AMF 150 has received an unsuccessful response (e.g., error message) from the ng-eNB node 120, the AMF 150 is able to dynamically determine the ng-eNB node 120 is operating in NSA mode, and the AMF 150 may update its records associated with the ng-eNB node 120, including updating the AMF 150's records regarding the ng-eNB node 120's connection mode configuration status and/or setting a signaling message configuration value associated with the ng-eNB node 120 corresponding to the connection mode configuration status.

Next, in operation 53003, the AMF 150 may decide to transmit a signaling message, e.g., a paging message, etc., to UEs within its territorial area, such as UEs connected to ng-eNB node 120 and gNB node 130. The AMF 150 may determine which RAN node(s) to transmit the signaling message to using the connection mode indications determined from the first signaling message responses sent by the ng-eNB node 120 and gNB node 130, etc. In operation 53004, the AMF 150 transmits a second paging message to the gNB node 130 because the gNB node 130 is in SA connection mode (e.g., a desired connection mode). The gNB node 130 then forwards the paging message to the appropriate UE device, such as UE 110. Additionally, in operation 53004B, the AMF 150 does not transmit a second paging message to ng-eNB node 120 because the ng-eNB node 120 is in NSA only mode (e.g., a non-desired connection mode), thereby reducing the number of signaling messages transmitted across the network, and increasing the efficiency of network resource usage.

Figure 4:
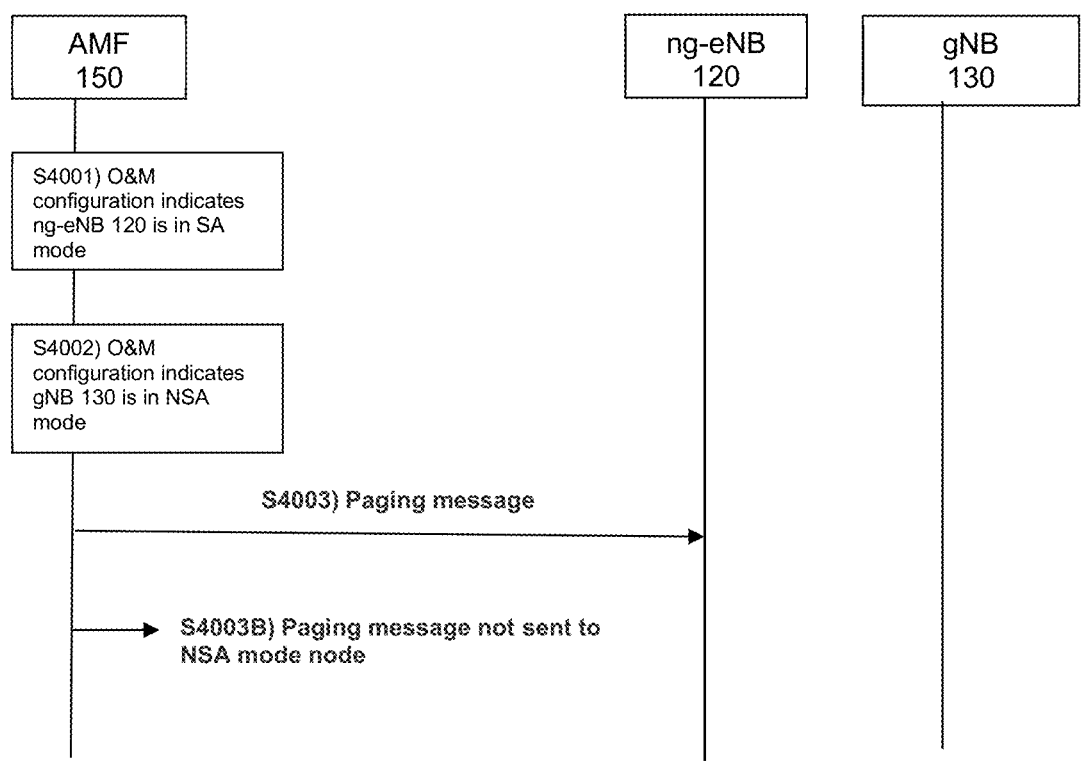

FIG. 4 is a fourth transmission flow diagram between at least one core network element and a plurality of RAN nodes connected to the core network illustrating a static method of configuring the connection modes of the plurality of RAN nodes according to at least one example embodiment.

In operations 54001 and 54002, the AMF 150 obtains O&M configuration values corresponding to the ng-eNB node 120 and the gNB node 130 from a O&M core network element (not shown). In this scenario, the O&M configuration values indicate that the ng-eNB node 120 is set to operate in SA mode and the gNB node 130 is set to operate in NSA mode. Accordingly, the AMF 150 statically determines the connection mode statuses of the ng-eNB node 120 and gNB node 130, and the AMF 150 may update its records associated with the ng-eNB node 120 and the gNB node 130, including updating the AMF 150's records regarding the ng-eNB node 120's and the gNB node 130's connection mode configuration statuses and/or setting signaling message configuration values associated with the RAN nodes corresponding to their respective connection mode configuration statuses.

In operation 54003, the AMF 150 then transmits a paging message to the ng-eNB node 120 based on the O&M configuration values associated with the ng-eNB node 120. In operation S4001B, the AMF 150 does not transmit a paging message to the gNB node 130 based on the O&M configuration values associated with the gNB node 130, thereby reducing the network usage, and increasing the efficiency of network resource usage.

Figure 5A:
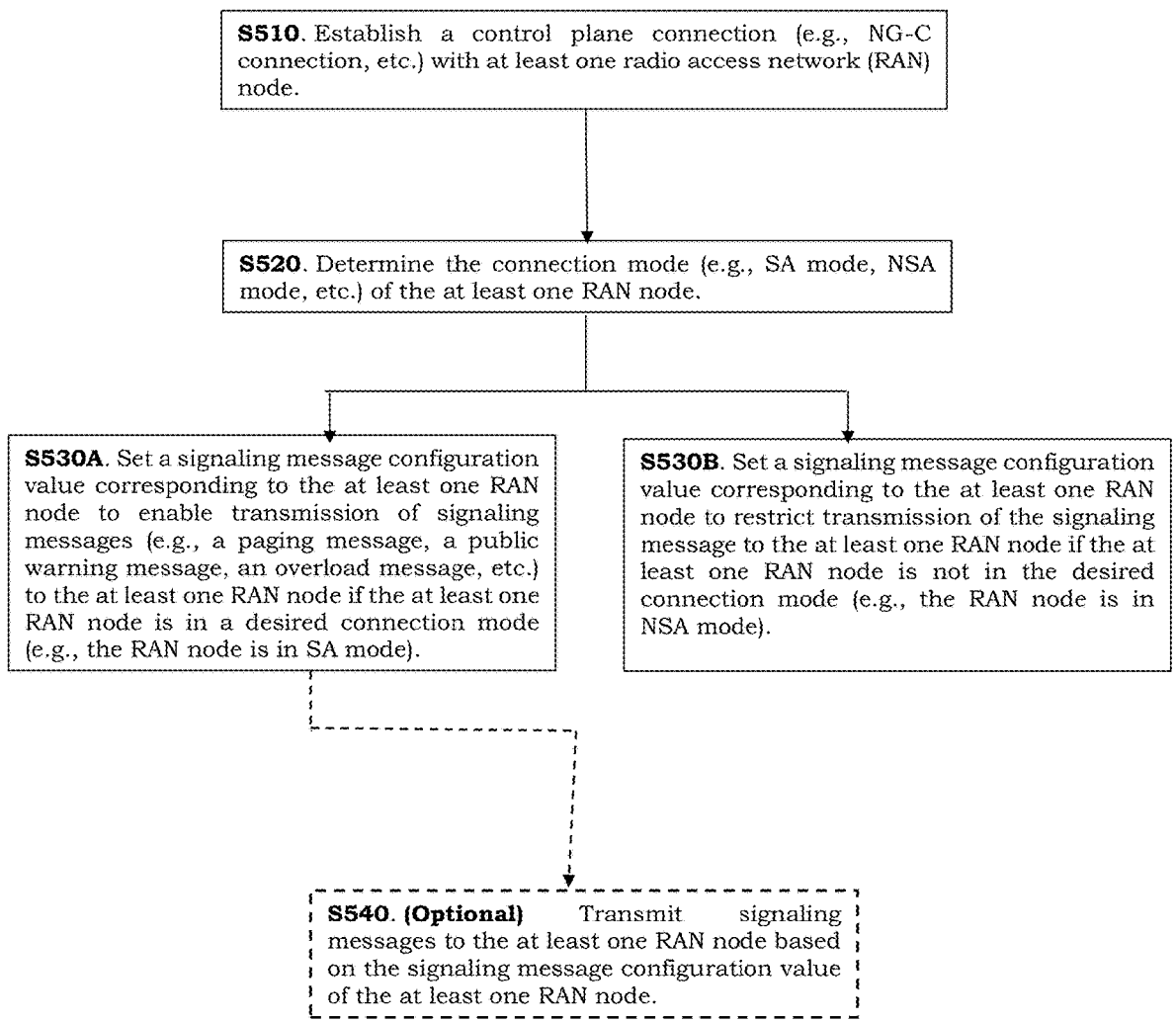

FIG. 5A is a flowchart illustrating a method for reducing signaling messages between at least one core network server and at least one RAN according to at least one example embodiment.

In operation S510, a core network server (e.g., core network element, core network device, etc.), such as AMF 150, may establish a control plane connection (e.g., NG-C connection, etc.) to at least one RAN node, such as RAN nodes 120 and 130, etc. The control plane connection allows the AMF 150 to transmit signaling messages, control plane messages, etc., destined for the RAN node to the RAN node, and/or signaling messages destined for one or more UE devices associated with and/or connected to the at least one RAN node through the RAN node. In operation S520, the core network server may determine the connection mode of the at least one RAN node. For example, the at least one RAN node may be capable of two or more connection modes, such as a SA mode or a NSA mode, etc.

In operation S530A, in response to the core network server determining that the at least one RAN node is in a desired connection mode, e.g., determines the at least one RAN node is in SA mode, the core network server may set a signaling message configuration value corresponding to the at least one RAN node to enable and/or allow transmission of signaling messages to the at least one RAN node. Examples of the signaling messages may include NGAP messages (e.g., paging messages, public warning messages, overload messages, etc.), but are not limited thereto. In operation S530B, in response to the core network server determining that the at least one RAN node is not in the desired connection mode, e.g., the at least one RAN node is in NSA mode, the core network server may set the signaling message configuration value corresponding to the at least one RAN node to restrict and/or prohibit transmission of signaling messages to the at least one RAN node.

In optional operation S540, the core network server may transmit future signaling messages to the at least one RAN node based on the signaling message configuration value of the at least one RAN node. For example, the core network server may transmit future signaling messages in response to the signaling message configuration value corresponding to the at least one RAN node indicating the RAN node is in a desired connection mode, such as SA mode, etc.

While FIG. 5A illustrates one method for reducing signaling messages between at least one core network server and at least one RAN, the example embodiments are not limited thereto, and other methods may be used. For example, according to at least one example embodiment, the RAN nodes may be capable of operating in three or more connection modes, and the desired connection mode may be a subset of the entire set of possible connection modes (e.g., a first connection mode and a second connection mode, etc.), and the non-desired connection mode may be a remaining subset of the entire set of possible connection modes (e.g., a third connection mode, etc.).

FIG. 5B is a flowchart illustrating a first method for determining whether a RAN node is a desired connection mode in association with the method of FIG. 5A according to at least one example embodiment. Referring now to FIGS. 5A and 5B, in operation S511, the core network server may determine the connection mode of the at least one RAN node by receiving a message from the at least one RAN node including a cause value and/or information indicating the connection mode (e.g., SA mode, NSA mode, etc.) of the at least one RAN node. The message may be a NG setup request message, a RAN configuration update message, etc., but the example embodiments are not limited thereto.

In operation S521, the core network server may determine whether the message received from the at least one RAN node indicates the RAN node is in the desired connection mode. In operation S531A, in response to the received message indicating the RAN node is in the desired connection mode (e.g., SA mode), the core network server sets the signaling message configuration value corresponding to the RAN node to enable and/or allow transmission of at least one future signaling message to the RAN node. For example, the core network server may create or update a database record stored in its memory corresponding to the at least one RAN node indicating transmission of future signaling messages to the at least one RAN node should be enabled/permitted and/or indicating the connection mode configuration value of the at least one RAN node is the desired connection mode, etc., but the example embodiments are not limited thereto.

In operation S531B, in response to the received message indicating the RAN node is in the non-desired connection mode (e.g., NSA mode), the core network server sets the signaling message configuration value corresponding to the RAN node to restrict and/or disable transmission of at least one future signaling message to the RAN node. For example, the core network server may create or update a database record stored in its memory corresponding to the at least one RAN node indicating transmission of future signaling messages to the at least one RAN node is restricted/disabled and/or indicating the connection mode configuration value of the at least one RAN node is the non-desired connection mode, etc., but the example embodiments are not limited thereto.

FIG. 5C is a flowchart illustrating a second method for determining whether a RAN node is a desired connection mode in association with the method of FIG. 5A according to at least one example embodiment.

Referring now to FIGS. 5A and 5C, in operation S522, the core network server may determine the connection mode of the at least one RAN node by transmitting at least a first signaling message to the at least one RAN node. The first signaling message may be a paging message, a public warning message, an overload message, etc. In operation S523, the core network server may receive a response message corresponding to the first signaling message from the at least one RAN node. For example, the response message may be an acknowledgement message, an error message including a cause value and/or information indicating the RAN node is in a non-desired connection mode (e.g., the RAN node is in NSA mode or otherwise does not support SA mode functionality), etc. In operation S524, the core network server determines whether the response message is an error message indicating the at least one RAN node is not in the desired connection mode by analyzing the contents of the response message, such as the cause value (e.g., error cause value), etc.

In operation S532A, in response to the core network server determining the response message is not an error message indicating the RAN node is in the non-desired connection mode (e.g., the RAN node is in SA mode), the core network server sets the signaling message configuration value corresponding to the RAN node to enable and/or allow transmission of at least one future signaling message to the RAN node.

In operation S532B, in response to the core network server determining the response message was an error message indicating the RAN node is not in the desired connection mode (e.g., the RAN node is in NSA mode), the core network server sets the signaling message configuration value corresponding to the RAN node to restrict and/or disable transmission of at least one future signaling message to the RAN node.

FIG. 5D is a flowchart illustrating a third method for determining whether a RAN node is a desired connection mode in association with the method of FIG. 5A according to at least one example embodiment.

Referring now to FIGS. 5A and 5D, in operation S525, the core network server accesses a local configuration database including configuration information (e.g., O&M configuration values, etc.) associated with the at least one RAN node. In operation S526, the core network server determines whether the local configuration setting for the RAN node indicates the RAN node is in the desired connection mode or the non-desired connection mode.

In operation S533A, the core network server sets the signaling message configuration value of the at least one RAN node to enable and/or allow transmission of future signaling messages to the at least one RAN node if the local configuration setting indicates the at least one RAN node is in the desired connection mode. In operation S533B, the core network server sets the signaling message configuration value of the at least one RAN node to restrict transmission of future signaling messages to the at least one RAN node if the local configuration setting indicates the at least one RAN node is in the non-desired connection mode.

FIG. 6 is a flowchart illustrating a method for operating a RAN node to reduce signaling messages between the RAN node and a core network according to at least one example embodiment.

In operation S610, the RAN node (e.g., ng-eNB node 120, gNB node 130, etc.) may set its connection mode to be at least a first connection mode (e.g., SA mode), a second connection mode (e.g., NSA mode), or a different connection mode. In operation S620, the RAN node may establish a control plane connection (e.g., a NG-C connection, etc.) with at least one core network server (e.g., AMF 150, etc.). In operation S630, the RAN node may transmit at least one message (e.g., a control plane connection request, a NG setup request, a RAN configuration update request, an error message in response to a signaling message trigger (e.g. a paging trigger, etc.), etc.) to the at least one core network server, the at least one message including an indication of the connection mode of the RAN node. According to at least one example embodiment, operations S620 and S630 may occur simultaneously and/or may be combined, but the example embodiments are not limited thereto. For example, the RAN node may transmit a control plane connection request including an indication of the connection mode of the RAN node, etc.

In response to the RAN node transmitting the at least one message, the core network server may be caused to selectively restrict transmission of at least one future signaling message to the RAN node based on the indication of the RAN node's connection mode. For example, if the at least one message indicates the RAN node is in NSA mode, the AMF 150 may be caused to restrict transmission of at least one future signaling message to the RAN node by setting a signaling message configuration value corresponding to the RAN node to restrict transmission of future signaling messages to the RAN node, etc. However, if the at least one message indicates the RAN node is in SA mode, the AMF 150 may be caused to enable and/or allow transmission of future signaling messages to the RAN node by setting the signaling message configuration value corresponding to the RAN node to enable transmission of future signaling messages to the RAN node, etc.

While FIGS. 5A to 6 illustrate various methods for reducing signaling messages between at least one core network server and at least one RAN, the example embodiments are not limited thereto, and other methods may be used to reducing signaling messages between at least one core network server and at least one RAN. Additionally, one of ordinary skill in the art will recognize that one or more of these methods may be combined into a single method, and/or one or more of the recited method operations may be combined, rearranged, omitted, and/or repeated, etc., without deviating from the scope of the example embodiments. Moreover, one of ordinary skill in the art will also recognize that one or more method operation may be executed simultaneously and/or in parallel with other method operations without deviating from the scope of the example embodiments.

Various example embodiments are directed towards a wireless network system capable of reducing and/or optimizing the transmission of signaling messages from at least one core network element and at least one RAN node based on a connection mode of the at least one RAN node. By determining the connection mode of the at least one RAN node prior to transmitting signaling messages to the RAN nodes connected to the core network element, the core network element may reduce and/or optimize the number of signaling messages transmitted to the RAN nodes, thereby reducing the usage of network resources.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A core network server, comprising:
a memory storing computer readable instructions; and
at least one processor configured to execute the computer readable instructions to,
receive a control plane connection request message from at least one radio access network (RAN) node, the at least one RAN node supporting at least one of a standalone architecture (SA) connection mode or a non-standalone architecture (NSA) connection mode, the control plane connection request message including an indication indicating that the at least one RAN node is in the SA connection mode or the NSA connection mode;
determine a connection mode of the at least one RAN node based on the indication; and
set a signaling message configuration value corresponding to the at least one RAN node based on the connection mode of the at least one RAN node.

2. The core network server of claim 1, wherein the at least one processor is further configured to:
enable transmission of at least one signaling message based on the connection mode of the at least one RAN node.

3. The core network server of claim 1, wherein the at least one processor is further configured to:
restrict transmission of at least one signaling message based on the connection mode of the at least one RAN node.

4. The core network server of claim 1, wherein the at least one processor is further configured to:
set the signaling message configuration value corresponding to the at least one RAN node to enable transmission of at least one signaling message to the at least one RAN node in response to the connection mode of the at least one RAN node being the SA connection mode; and
set the signaling message configuration value corresponding to the at least one RAN node to restrict transmission of the at least one signaling message to the at least one RAN node in response to the connection mode of the at least one RAN node being the NSA connection mode.

5. The core network server of claim 1, wherein
the at least one RAN node is a plurality of RAN nodes; and
the at least one processor is further configured to,
determine which RAN nodes of the plurality of RAN nodes are in the SA connection mode, and
set the signaling message configuration value to enable transmission of at least one signaling message to the RAN nodes of the plurality of RAN nodes that are determined to be in the SA connection mode.

6. The core network server of claim 1, wherein
the at least one RAN node is a plurality of RAN nodes; and
the at least one processor is further configured to,
determine which RAN nodes of the plurality of RAN nodes are in the NSA connection mode, and
set the signaling message configuration value to restrict transmission of at least one signaling message to the RAN nodes of the plurality of RAN nodes that are determined to be in the NSA connection mode.

7. The core network server of claim 1, wherein the at least one processor is further configured to:
selectively transmit at least one paging message to the at least one RAN node based on results of the determining the connection mode of the at least one RAN node.

8. The core network server of claim 7, wherein the at least one paging message includes information relating to a tracking area associated with the at least one RAN node.

9. The core network server of claim 1, wherein the at least one processor is further configured to:
receive the control plane connection request message as an NG Setup Request from the at least one RAN node.

10. A radio access network (RAN) node supporting at least one of a standalone architecture (SA) connection mode or a non-standalone architecture (NSA) connection mode, comprising:

a memory storing computer readable instructions; and
at least one processor configured to execute the computer readable instructions to,
  set a connection mode of the RAN node, the connection mode being at least the SA connection mode or the NSA connection mode; and
  transmit at least one control plane connection request message to at least one core network server, the at least one control plane connection request message including an indication of the connection mode of the RAN node,
    the transmitted at least one control plane connection request message causing the at least one core network server to selectively restrict transmission of at least one signaling message based on the indication of the connection mode.

11. The RAN node of claim 10, wherein
the transmitted at least one control plane connection request message indicates that the RAN node is in the SA connection mode, the transmitted at least one control plane connection request message causing the at least one core network server to enable transmission of the at least one signaling message.

12. The RAN node of claim 10, wherein
the transmitted at least one control plane connection request message indicates that the RAN node is in the NSA connection mode, the transmitted at least one control plane connection request message causing the at least one core network server to restrict transmission of the at least one signaling message.

13. The RAN node of claim 10, wherein the at least one signaling message includes a paging message.

14. The RAN node of claim 10, wherein the at least one paging message includes information relating to a tracking area associated with the RAN node.

15. A method of operating at least one core network server, the method comprising:
  establishing, using at least one processor, a control plane connection with at least one radio access network (RAN) node, the at least one RAN node supporting at least one of a standalone architecture (SA) connection mode or a non-standalone architecture (NSA) connection mode;
  determining, using the at least one processor, a connection mode of the at least one RAN node based on an indication from the at least one RAN node;
  setting, using the at least one processor, a signaling message configuration value corresponding to the at least one RAN node based on results of the determining the connection mode of the at least one RAN node; and
  determining, using the at least one processor, whether to transmit at least one signaling message based on the signaling message configuration value for the at least one RAN node.

16. The method of claim 15, wherein the determining whether to transmit the at least one signaling message to the at least one RAN node includes:
  enabling transmission of the at least one signaling message to the at least one RAN node in response to the signaling message configuration value of the at least one RAN node indicating the at least one RAN node is in the SA connection mode; and
  restricting transmission of the at least one signaling message to the at least one RAN node in response to the signaling message configuration value of the at least one RAN node indicating the at least one RAN node is in the NSA connection mode.

17. The method of claim 15, wherein the establishing the control plane connection with the at least one RAN node includes:
  receiving, using the at least one processor, a control plane connection request message from the at least one RAN node, the control plane connection request message including the indication indicating that the at least one RAN node is in the SA connection mode or the NSA connection mode.

18. The method of claim 15, further comprising:
  updating, using the at least one processor, the signaling message configuration value corresponding to the at least one RAN node based on the indication of the received message.

19. The method of claim 15, further comprising:
  selectively transmitting, using the at least one processor, the at least one signaling message based on results of the determining whether to transmit the at least one signaling message.

20. The method of claim 19, wherein the at least one signaling message includes a paging message, the paging message including information relating to a tracking area associated with the at least one RAN node.

* * * * *